Patented July 5, 1949

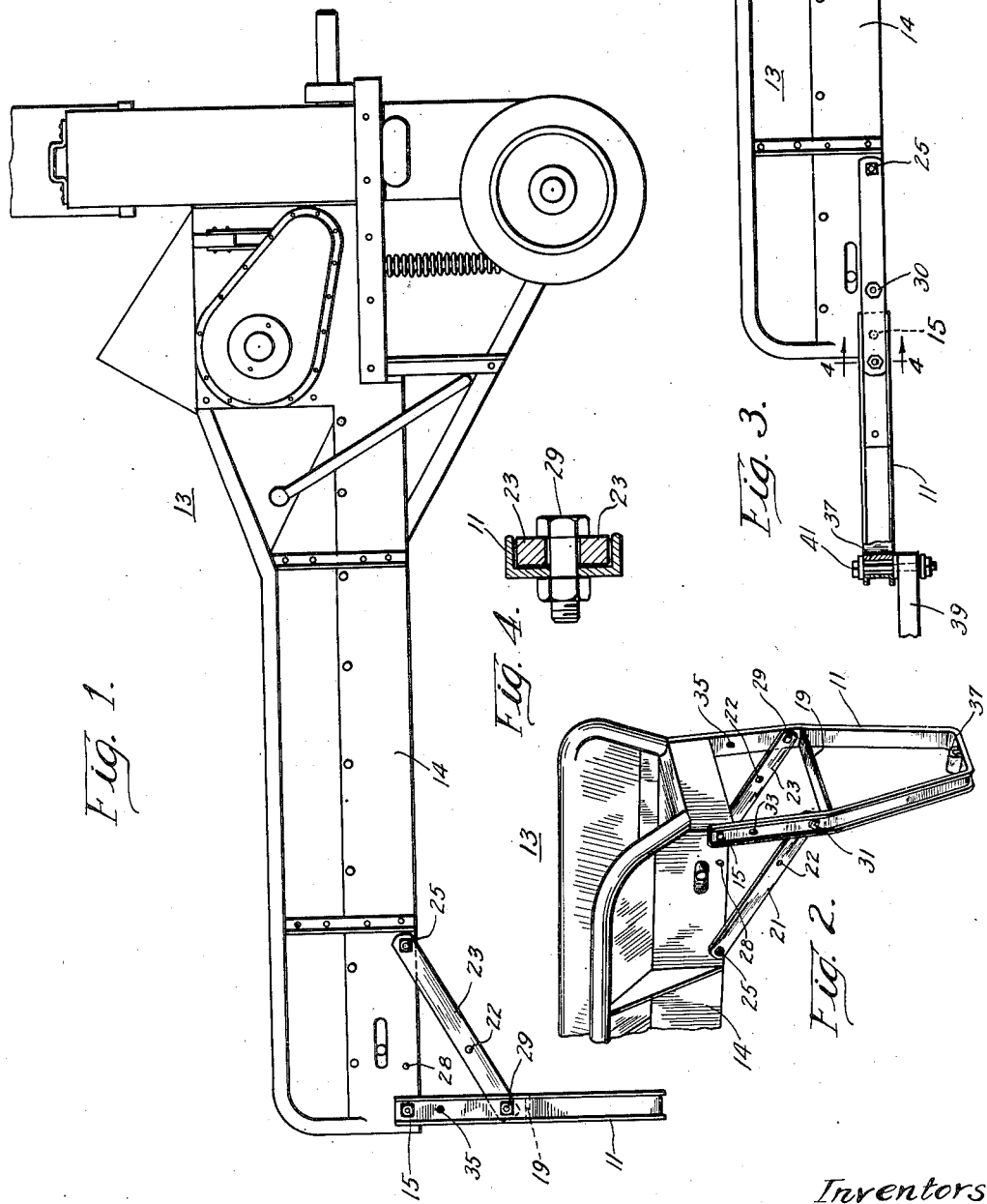

2,475,145

UNITED STATES PATENT OFFICE 2,475,145

COMBINATION DRAWBAR AND VEHICLE SUPPORT

Norman R. Krause and Charles W. Hansen, Racine, Wis., assignors to J. I. Case Company, Racine, Wis., a corporation of Wisconsin Application September 27, 1946, Serial No. 699,874

3 Claims. (Cl. 280—33.4)

The present invention relates to a combination draw bar and vehicle support for use with two-wheeled equipment of the type which is adapted to be moved from place to place by a draft means such as a tractor or truck.

The principal object of this invention is to provide an improved device of this type particularly adapted for use in connection with feed cutters, trailers, and other two-wheeled vehicles which require a support or stand when not attached to the draft vehicle and a sturdy draw bar when they are in transit. The various features of the invention will be made clear by the following description and the accompanying illustrative embodiment thereof.

In the drawings:

Fig. 1 is a side elevational view of a typical feed cutter supported by a vehicle support in accordance with the invention;

Fig. 2 is a perspective view of the installation of the vehicle support upon the feed cutter illustrated in Fig. 1;

Fig. 3 is a side elevational view of the support in the draw bar position;

Fig. 4 is a cross-sectional view, on the line 4—4 of Fig. 3, of the strengthening and locking features of the device when in position as a draw bar.

The usual method of attaching a portable machine such as a feed cutter to a draft vehicle requires the swinging of a heavy pivoted draw bar member into a forward position and the bolting or fastening of that member to a supporting member on the vehicle. The connection between the trailer unit and the draft vehicle is thus effected by a single heavy draw bar. The draw bar can be released and moved to either side when the machine is in operation, but it is difficult to place the draw bar in such a position that it does not interfere with the movements of the workmen and thus causes a hazard to their safety. When in operation, the vehicle is supported by a supporting member, such as a third wheel, which in most instances is not capable of retraction against the frame of the vehicle. It is difficult to move a vehicle equipped with the old time draw bars with a light pickup type truck because the trailer-supporting member does not provide sufficient road clearance to allow passage over rough or mired roads.

The improved combination draw bar and vehicle support of our invention overcomes these disadvantages, and, at the same time, provides a more satisfactory stationary support than the known structures. It comprises a U-shaped yoke member 11 which is fabricated from a channel-shaped structural section, desirably of structural steel. The yoke member has sufficient strength to support the vehicle 13 and is hinged to the frame 14 of the vehicle 13 by a suitable pivotal connection which may be the rivets or bolts 15. The U-shaped supporting member 11 is braced by a transverse member 19. Two links 21 and 23 are releasably attached at one end to the support member 11 by bolts 29 and 31, as illustrated, and serve to brace that member during use either as a support or as a draw bar. The other end of each of the two links 21 and 23 is pivotally connected to the frame of the vehicle 13 by hinge pins 25 in order to permit the links to be swung from the position shown in Figs. 1 and 2 to the horizontal draw bar position shown in Fig. 3. Thus, when in use as a support for the machine, the U-shaped member 11, with its transverse strengthening member 19 and the two hinged link braces 21 and 23, provide a rigid stand which is capable of safely withstanding bending forces in all directions. In many applications of this device it will be desirable to anchor the vehicle so as to provide a unit that will not "crawl" as a result of the vibrations produced during the operation of the machine. The combination draw bar and support of the invention provides a support or stand which tends to anchor itself in the ground due to the gripping action resulting from its channel flanges and yoke shape.

When it is desired to move the cutter to another location the operator has but to remove bolts 29 and 31, swing the U-shaped support 11 into a horizontal position, place the links 21 and 23 within the channel flanges of said supporting member. The links 21 and 23 are then bolted into place, as shown in Fig. 3, by locating bolts 29 and 31 in holes 33 and 35 provided in the yoke 11. Added rigidity is obtained by a bolt 30 which may be inserted through coinciding holes 22 and 28 in the link and the frame respectively. The draft bearing 37 allows connection of yoke 11 to the draft bar 39 (Fig. 3) of a tractor or other draft vehicle by suitable means such as a connecting pin or bolt 41. The links 21 and 23, when locked in the channel flanges (as shown in Fig. 4), provide the effect of a single rigid member attached to the frame of the vehicle. The U-shaped draw bar and vehicle support 11 provides uniform division of the stresses applied to the frame of the vehicle with which the member 11 is used. This reduces the tendency of the drawn vehicle to sway at high speeds.

It is readily observed that the change from a supporting member to a rigid draw bar may be effected with great ease. The stand, when in traveling position, does not present any projections which can interfere with the transit of the vehicle even though it is drawn over very rough terrain. When in a supporting position the stand presents a sturdy support which is capable of withstanding bending moments in all directions. The braces on the stand unit are so placed that there is no obstruction to movement of workmen in the vicinity of the machine, and the device is self-anchoring. The lower portion of the U-shaped support forms a skid which facilitates local movements of the machine if it is desirable to change the position of the machine by hand.

The features of our invention that we believe to be new are expressly set forth in the following claims.

We claim the following as our invention:

1. In an apparatus of the class described a vehicle having a frame, support wheels journalled to said frame, and a combination draw bar and support means, said means comprising a support member having a longitudinally grooved upper section which is pivotally connected to said frame, said support member being movable from a vertical support position to a horizontal draw bar position, and means for locking said member in either of said positions, said locking means comprising at least one rigid link hinged at one end to said frame, the other end of said link engaging and bracing said support member when said member is in the vertical, vehicle-supporting position, and at least a portion of said link engaging said grooved section when said support member is in the horizontal draw bar position, so as to effect a locking interengagement of said link member and said support member.

2. In an apparatus of the class described a vehicle having a frame, support wheels journalled to said frame, and a combination draw bar and support means, said means comprising a U-shaped support member having a channel-shaped cross section, said support member being pivotally connected to said frame and movable from a vertical vehicle-supporting position to a horizontal, draw bar position, and means for locking said member in either of said positions, said locking means comprising a pair of spaced apart rigid links each of which is hinged at one end to said frame, the other end of each of said links engaging and bracing said support member when that member is in a vertical, vehicle-supporting position, and at least a portion of each of said links interlocking with the channel flanges of one of the upper end portions of said support member when said support member is in a horizontal or draw bar position, thereby locking said support member in that position.

3. In an apparatus of the class described a vehicle having a frame, a pair of support wheels journalled to said frame, and a combination draw bar and support means, said means comprising a U-shaped support member having a channel-shaped cross section which provides a pair of flanges, said support member having a flattened portion at the lower end thereof and a connecting bearing attached thereto operable to engage the draft bar of a draft vehicle, said support member being pivotally connected to said frame and movable from a vertical, vehicle-supporting position to a horizontal, draw bar position, and means for locking said member in either of said positions, said locking means comprising a pair of spaced apart, rigid, metal links each of which is hinged at one end to said frame, the other end of each of said links engaging and bracing said support member when that member is in the vertical position, and at least a portion of each of said links interlocking with said flanges of one of the upper end portions of said support member when said member is in the vehicle-supporting position.

NORMAN R. KRAUSE.
CHARLES W. HANSEN.

REFERENCES CITED

The following references are of record in the file of this patent:

UNITED STATES PATENTS

| Number | Name | Date |
| --- | --- | --- |
| 767,635 | Daley | Aug. 16, 1904 |
| 1,546,984 | Howell | July 21, 1925 |
| 1,894,320 | Wittlinger | Jan. 17, 1933 |
| 1,968,046 | Linn | July 31, 1934 |
| 2,027,127 | Tastenhoye | Jan. 7, 1936 |
| 2,038,975 | Willets | Apr. 28, 1936 |
| 2,207,812 | McClellan | July 16, 1940 |